United States Patent
Groves et al.

(10) Patent No.: US 8,640,077 B1
(45) Date of Patent: Jan. 28, 2014

(54) CAPTURING MUTUAL COUPLING EFFECTS BETWEEN AN INTEGRATED CIRCUIT CHIP AND CHIP PACKAGE

(75) Inventors: Robert A. Groves, Highland, NY (US); Wan Ni, San Jose, CA (US); Stephen A. St. Onge, Colchester, VT (US); Jiansheng Xu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/561,760

(22) Filed: Jul. 30, 2012

(51) Int. Cl.
 G06F 17/50 (2006.01)
 G06F 11/22 (2006.01)
 G06F 9/455 (2006.01)

(52) U.S. Cl.
 USPC ............. 716/136; 716/100; 716/106

(58) Field of Classification Search
 USPC .................................. 716/100, 136
 See application file for complete search history.

(56) References Cited

U.S. PATENT DOCUMENTS

| | | |
|---|---|---|
| 6,185,722 B1 | 2/2001 | Darden et al. |
| 6,829,754 B1 | 12/2004 | Yu et al. |
| 7,131,084 B2 | 10/2006 | Cannon et al. |
| 7,231,618 B2 | 6/2007 | Huang et al. |
| 7,818,698 B2 | 10/2010 | Su et al. |
| 7,831,949 B2 | 11/2010 | Tokunaga et al. |
| 7,904,864 B2 | 3/2011 | Huynh et al. |
| 2004/0025136 A1* | 2/2004 | Carelli ............ 716/17 |
| 2006/0036980 A1 | 2/2006 | Kobayashi |
| 2008/0127010 A1* | 5/2008 | Beattie et al. ............ 716/4 |
| 2009/0019411 A1* | 1/2009 | Chandra et al. ............ 716/9 |
| 2009/0077507 A1 | 3/2009 | Hou et al. |
| 2009/0327981 A1 | 12/2009 | Nakamura et al. |
| 2010/0332193 A1 | 12/2010 | Hu et al. |
| 2011/0093828 A1 | 4/2011 | Lee et al. |
| 2011/0167399 A1* | 7/2011 | Schroeder et al. ............ 716/122 |
| 2011/0260318 A1 | 10/2011 | Eisenstadt |
| 2011/0296369 A1 | 12/2011 | Okamoto et al. |

OTHER PUBLICATIONS

Qi et al. "A Fast 3D Modeling Approach to Parasitics Extraction of Bonding Wires for RF Circuits", 1998 IEEE, 4 pages.
Hong et al. "A New Fast and Accurate Method of Extracting the Parasitics of Multi-layer Packages", 2003 IEEE, pp. 189-192.
Yuan et al. "Electrical Characterization of Interconnect in High-Performance BGA Packages", 2008 IEEE, pp. 1018-1022.
Zheng et al. "A simulation-based design method to transfer surface mount RF system to flip-chip die implementation", Electronic System-Integration Technology Conference, 2010, 5 pages.
Chang et al. "Parasitic Characteristics of BGA Packages", 1998 IEEE Symposium on Digital Object Identifier, pp. 124-129.

* cited by examiner

Primary Examiner — Stacy Whitmore
Assistant Examiner — Magid Dimyan
(74) Attorney, Agent, or Firm — Richard Kotulak; Roberts Mlotkowski Safran & Cole, P.C.

(57) ABSTRACT

Systems and methods are provided for capturing mutual coupling effects between an integrated circuit chip and chip package using electronic design automation (EDA) tools. Specifically, a method is provided that is implemented in a computer infrastructure for designing an integrated circuit chip. The method includes compiling process technology parameters that describe electrical behavior for a chip-package coupling and a package of the integrated circuit chip. The method also includes generating a parasitic technology file to include the compiled process technology parameters.

20 Claims, 10 Drawing Sheets

CAPTURING MUTUAL COUPLING EFFECTS BETWEEN AN INTEGRATED CIRCUIT CHIP AND CHIP PACKAGE

FIELD OF THE INVENTION

The invention relates to circuit design and, more particularly, to systems and methods for capturing mutual coupling effects between an integrated circuit chip and chip package using electronic design automation (EDA) tools.

BACKGROUND

As technology continues to scale into the sub-micron realm, applications move toward higher frequencies and higher levels of integration such that parasitic effects from interconnect wiring significantly affect integrated circuit performance. For example, the parasitic effects from interconnect wiring play an important role in timing, power, gain, matching network, reliability, and noise performance of the integrated circuit such that the parasitic effects from interconnect wiring can no longer be ignored or the integrated circuit may fail.

Specifically, one of the challenges faced by submicron integrated circuit designers is the issue of parasitic effects from the interconnect wiring between a semiconductor die or chip and a chip package, e.g., chip-package coupling. More specifically, the interaction between a semiconductor die or chip when packaged using flip chip technology can cause a significant parasitic coupling effect between the chip and the package due to the fact that the chip and package (solder bumps and the first package metal layer) are located in very close proximity. A chip is semiconductor material, e.g., silicon, in which an integrated circuit is formed, and a chip package is the substrate upon which the chip, or chips, is mounted, e.g., a ceramic laminate package, or printed circuit board. The chip package provides a means of connecting the internal chip components to external circuitry. The chip-package coupling has become a major factor in successfully predicting performance of the integrated circuit on the chip.

In order to take parasitic effects from interconnect wiring into consideration during post layout analysis of an integrated circuit, it is necessary to create electrical models for the physical connections present between the various devices in the integrated circuit design. This process is typically known as parasitic extraction (PEX). However, traditional PEX methodologies only capture chip level couplings and by default assume a mounted package without taking into account mutual coupling effects between the chip and the chip package.

Common practice in order to take into account the chip-package coupling in predicting performance of an integrated circuit includes using an electromagnetic (EM) simulator to model chip package effects and to evaluate the chip-package coupling. However, EM simulation capability is limited by the complexity of interconnect wiring structures. Additionally, package metal routing is commonly modeled by 3-D EM tools, while chip-level parasitics are usually modeled by EDA PEX tools. The integration of an EM model netlist derived from 3-D EM tools and an on chip parasitic netlist derived from EDA PEX tools into simulations is typically a challenge due to different formats from tool vendors, interface restrictions, etc. Furthermore, stand-alone models of chip packages do not take into account mutual coupling effects between the chip and the chip package.

Accordingly, there exists a need in the art to overcome the deficiencies and limitations described hereinabove.

BRIEF SUMMARY

In a first aspect of the invention, a method is provided that is implemented in a computer infrastructure for designing an integrated circuit chip. The method comprises compiling process technology parameters that describe electrical behavior for a chip-package coupling and a package of the integrated circuit chip. The method further comprises generating a parasitic technology file to include the compiled process technology parameters.

In another aspect of the invention, a method is provided for post-design testing and optimization of an integrated circuit chip. The method comprises completing a design and layout of the integrated circuit chip. The method further comprises initiating a parasitic extraction for the integrated circuit chip, including compiling process technology parameters that describe electrical behavior for a chip-package coupling and a package of the integrated circuit chip, and generating a parasitic technology file including the compiled process technology parameters. The method further comprises generating a parasitic extraction result. The method further comprises inputting the parasitic extraction result into a post-layout simulation.

In yet another aspect of the invention, a method is provided that is implemented in a computer-aided design system for generating a functional design model of an integrated circuit chip. The method comprises defining a parasitic technology file containing elements that define at least one metal layer of an integrated circuit chip package. The method further comprises writing process technology parameters that describe electrical behavior for regions of the integrated circuit chip, the integrated circuit chip package, and chip-package coupling into the parasitic technology file.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

FIG. 1 shows an example of a chip mounted to a flip chip package;

FIG. 2 shows an example of coupling effects between an integrated circuit chip and chip package in accordance with aspects of the invention;

FIG. 3 is an illustrative external environment for implementing the invention in accordance with aspects of the invention;

FIGS. 4 and 5 are flow diagrams of processes in accordance with aspects of the invention;

FIG. 6 shows a cross-section of a comprehensive parasitic technology file in accordance with aspects of the invention;

FIGS. 7-12 show examples of using a comprehensive parasitic technology file in accordance with aspects of the invention; and FIG. 13 is a flow diagram of a design process used in semiconductor design, manufacture, and/or test used with the system and method of the present invention.

DETAILED DESCRIPTION

The invention relates to circuit design and, more particularly, to systems and methods for capturing mutual coupling effects between an integrated circuit (IC) chip and chip package using electronic design automation (EDA) tools. More specifically, the present invention provides a methodology for incorporating IC package modeling into an integrated circuit layout parasitic network for a flip chip chip design.

PEX accuracy and design automation enablement have become more critical with the increase in performance, density, complexity, and levels of integration in submicron designs of integrated circuit, e.g., analog mixed-signal and radio frequency (RF) designs. Accordingly, implementations of the invention provide for methods to generate comprehensive parasitic technology files that account for the coupling effects between the chip and package in the design kit. These methods can be utilized by different process technologies or systems and different EDA tools to effectively and efficiently model the chip package coupling effects and to evaluate the chip-package coupling.

Figure 1:
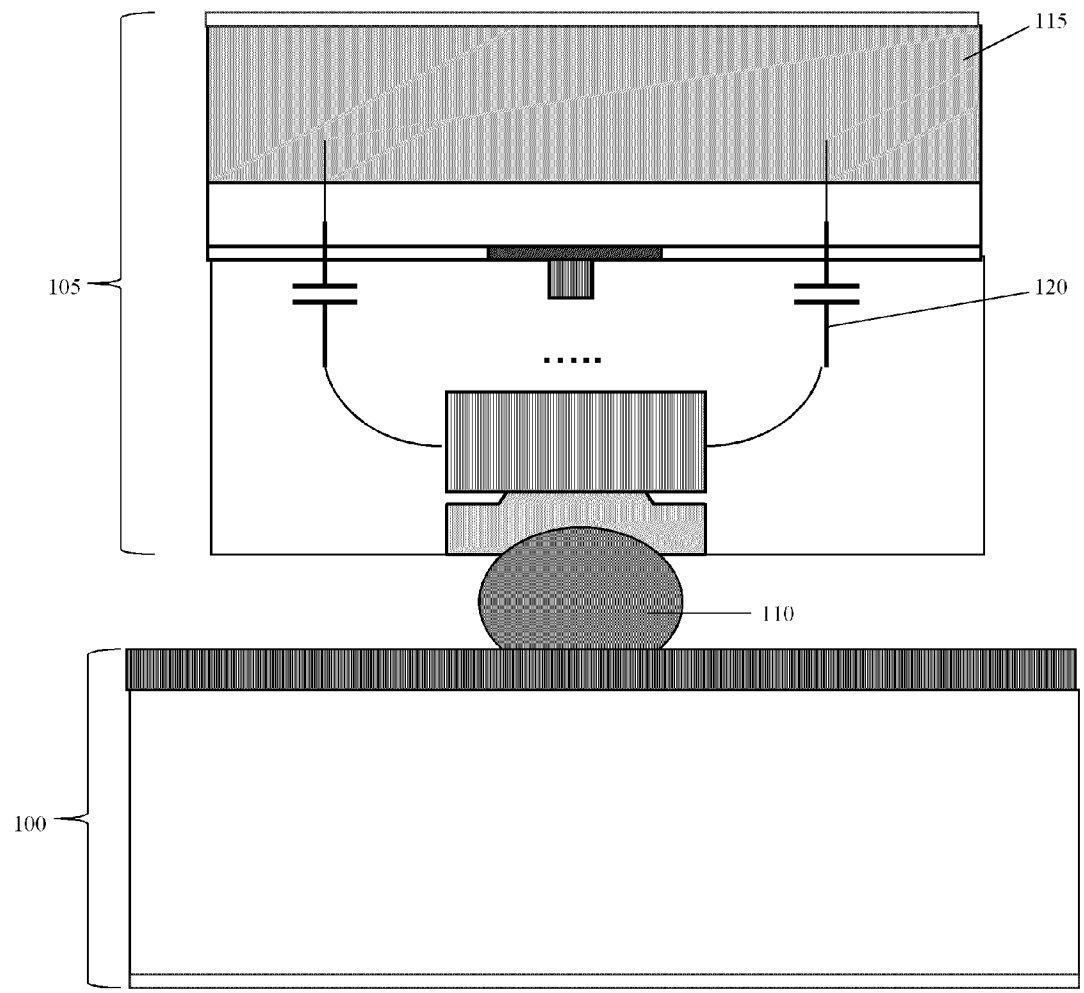

FIG. 1 shows an example of a traditional chip-package coupling. Specifically, FIG. 1 shows a portion of a package 100 that holds one or more chips and a portion of a chip 105 flipped upside down and connected to the package 100 by a via 110 (e.g., a flip chip solder bump connection). A flip chip, sometimes known as controlled collapse chip connection (C4), is a method for interconnecting semiconductor devices, such as integrated circuit (IC) chips and microelectromechanical systems (MEMS), to external circuitry with solder bumps that have been deposited onto the chip pads. The solder bumps are deposited on the chip pads on the top side of the wafer during a final wafer processing step. In order to mount the chip to external circuitry (e.g., chip packaging, a circuit board, or another chip or wafer), the chip is flipped over so that its top side faces down, and is aligned so that its pads align with matching pads on the external circuit, and then the solder is flowed to complete the interconnect. This is in contrast to wire bonding, in which the chip is mounted upright and wires are used to interconnect the chip pads to external circuitry.

In designing the chip 105 of FIG. 1, a circuit designer typically uses components of a design kit to create the circuits within the chip 105 and to simulate the interaction of the circuits to generate a model of behavior for the chip 105. Part of the simulation process is to calculate parasitic capacitances and resistances associated with interconnect wiring 120 in the chip 105, and model how the interconnect wirings 120 interact with a silicon substrate 115 in the chip 105. Typically, in a separate step of the design process, the package 100 is treated as having its own capacitances and resistances such that a separate model of behavior is generated for the package 100. The separate models of behavior for the chip 105 and the package 100 are treated as if these models cover all interactions. However, there are capacitive coupling elements between the chip 105 and packaging 100 that are not traditionally accounted for during the circuit design process by the circuit designer. For example, in the traditional circuit design process, the C4 via 110 is simply indicated in the circuit design as making a connection between the chip 105 and packaging 100, and the circuit designer ignores any capacitive coupling between the chip 105 and packaging 100.

Figure 2:
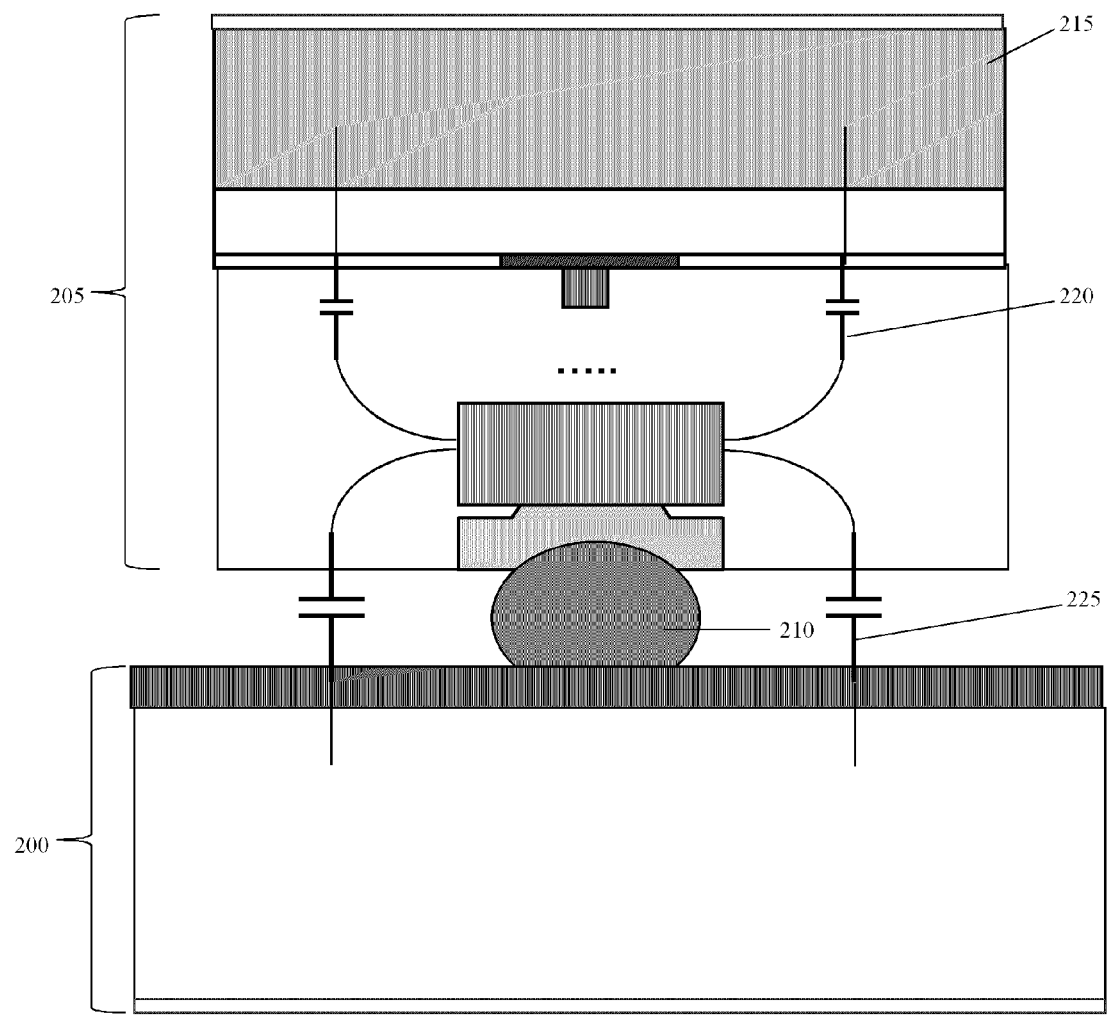

FIG. 2 shows an example of a chip-package coupling and illustrates flip chip package effects in accordance with aspects of the invention. Specifically, FIG. 2 shows a portion of the package 200 that holds one or more chips and a portion of the chip 205 flipped upside down and connected to the package 200 by a via 210 (e.g., a flip chip solder bump connection). In designing the chip 205 of FIG. 2, a circuit designer uses components of a design kit to create the circuits within the chip 205 and to simulate the interaction of the circuits to generate a model of behavior for the chip 205. Part of the simulation process is to calculate parasitic capacitances and resistances associated with interconnect wiring 220 in the chip 205, and model how the interconnect wirings 220 interact with a silicon substrate 215 in the chip 205. Another part of the simulation process that is provided in accordance with aspects of the invention, includes treating the package 200 as if it is part of the chip 205 within the design kit tool. For example, the details of the capacitive chip-package coupling 225 are included within a technology file (e.g., a parasitic technology file) of the design kit such that the parasitic extraction tool is provided with information pertaining to the capacitive chip-package coupling 225 and capable of accurately simulating behavior for the chip 205 and the package 200 as an integrated unit. Specially, in the instance of a chip package with a high resistivity substrate, the circuit interconnect wiring could have a stronger coupling to package metals than a backside of the wafer with, e.g., ~700 µm wafer thickness. Therefore, an integrated parasitic modeling of the chip-package is a process to accurately capture the actual coupling distribution.

In embodiments, the systems and methods of the invention allow for post-layout simulations incorporating chip and chip package interactions simultaneously. Advantageously, implementations of the invention enable modeling of the mutual coupling between on-chip circuits and the chip package. Even more advantageously, implementations of the invention provide a truly comprehensive extraction solution that allows design houses to have reliable parasitic analysis, reduced silicon spins, and accelerated time to market.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program instructions may also be stored in the computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
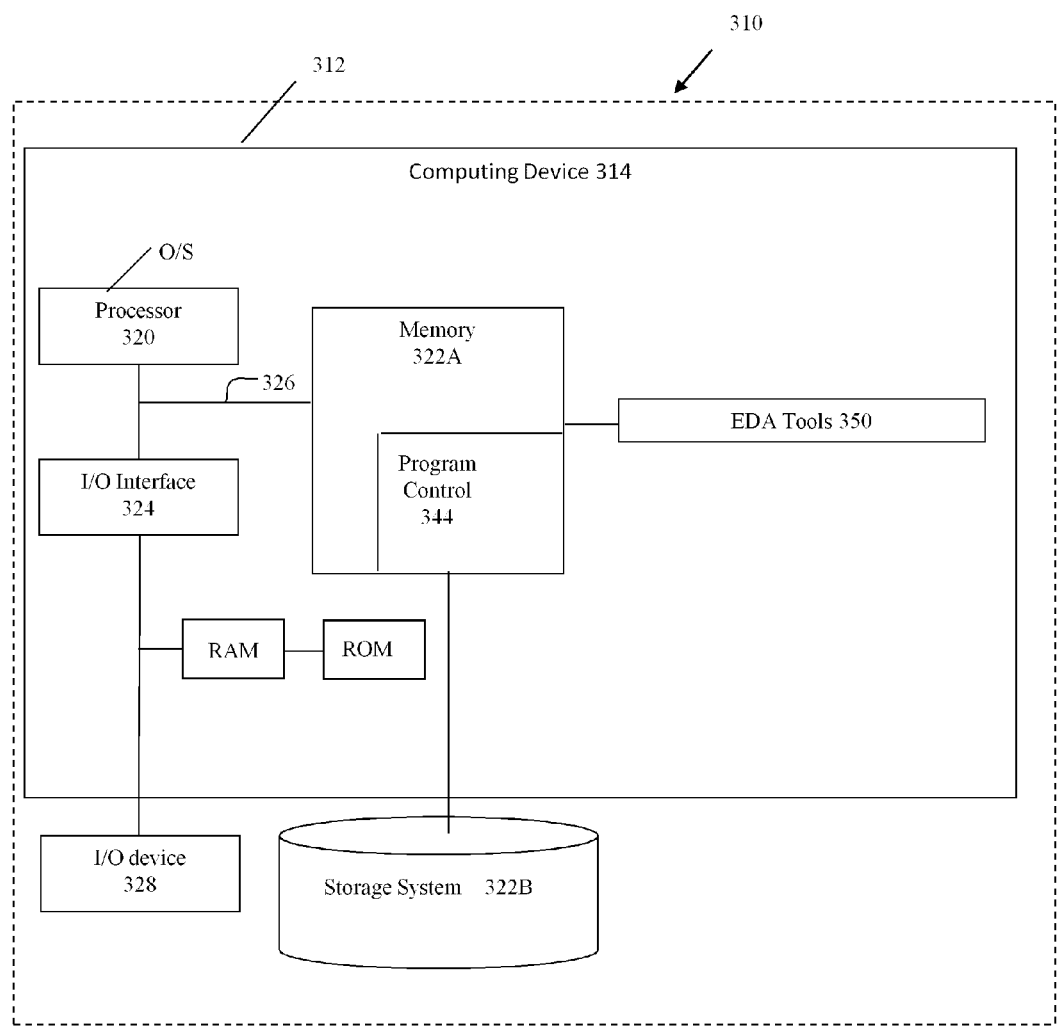

FIG. 3 shows an illustrative environment 310 for managing the processes in accordance with the invention. To this extent, the environment 310 includes a server or other computing system 312 that can perform the processes described herein. In particular, the server 312 includes a computing device 314. The computing device 314 can be resident on a network infrastructure or computing device of a third party service provider (any of which is generally represented in FIG. 3).

The computing device 314 also includes a processor 320, memory 322A, an I/O interface 324, and a bus 326. The memory 322A can include local memory employed during actual execution of program code, bulk storage, and cache memories, which provide temporary storage of at least some program code, in order to reduce the number of times code should be retrieved from bulk storage during execution. In addition, the computing device includes random access memory (RAM), a read-only memory (ROM), and an operating system (O/S).

The computing device 314 is in communication with the external I/O device/resource 328 and the storage system 322B. For example, the I/O device 328 can comprise any device that enables an individual to interact with the computing device 314 (e.g., user interface) or any device that enables the computing device 314 to communicate with one or more other computing devices using any type of communications link. The external I/O device/resource 328 may be for example, a handheld device, PDA, handset, keyboard, etc.

In general, the processor 320 executes computer program code (e.g., program control 344), which can be stored in the memory 322A and/or storage system 322B. Moreover, in accordance with aspects of the invention, the program control 344 controls EDA tools 350 to perform the processes described herein. The EDA tools 350 can be implemented as one or more program code in the program control 344 stored in memory 322A as separate or combined modules. Additionally, the EDA tools 350 may be implemented as a separate dedicated processor or several processors to provide the function of these tools. While executing the computer program code, the processor 320 can read and/or write data to/from memory 322A, storage system 322B, and/or I/O interface 324. The program code executes the processes of the invention. The bus 326 provides a communications link between each of the components in the computing device 314.

In embodiments, the EDA tools 350 can extract parasitics of an integrated circuit including capturing mutual coupling effects between the integrated circuit chip and the chip package. For example, in accordance with aspects of the invention, the EDA tools 350 can compile process technology parameters for regions of the integrated circuit chip, the chip-packaging coupling, and the chip package, and generate a comprehensive parasitic technology file comprising the compiled process technology parameters.

Figure 4:
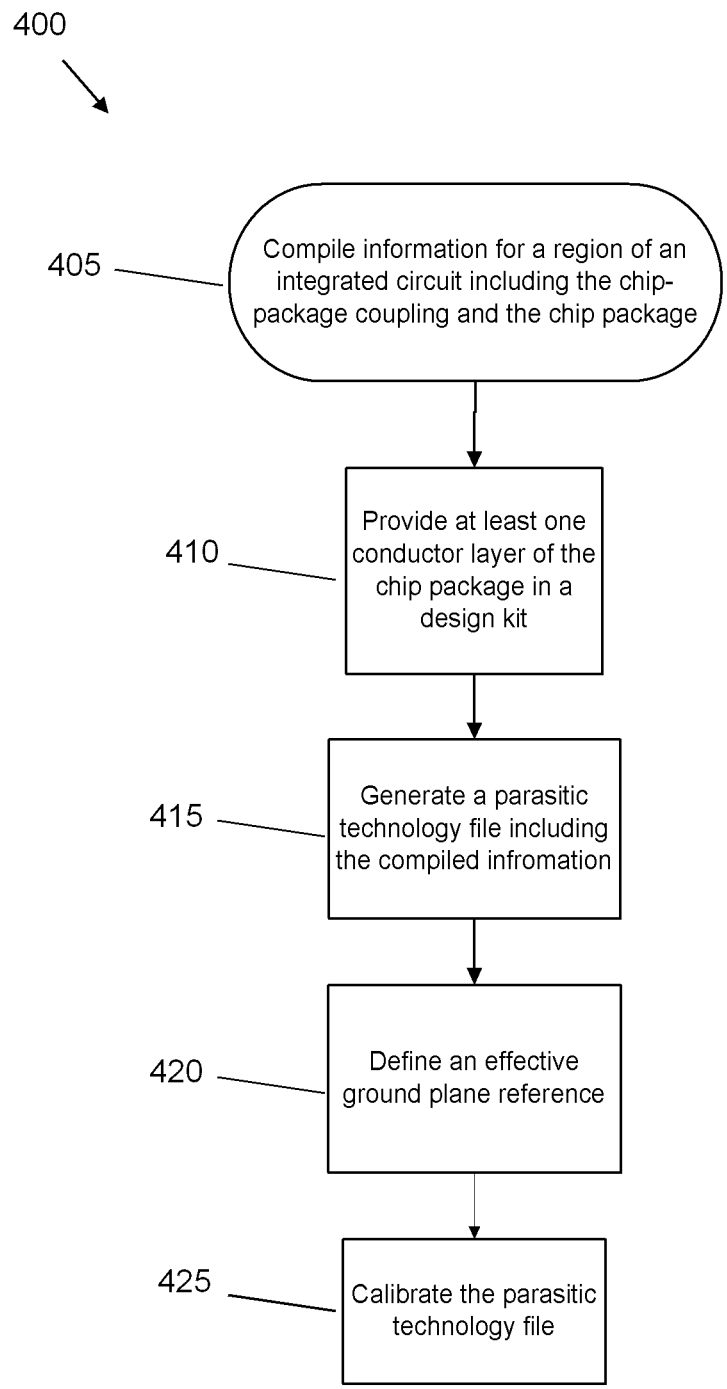
Figure 5:
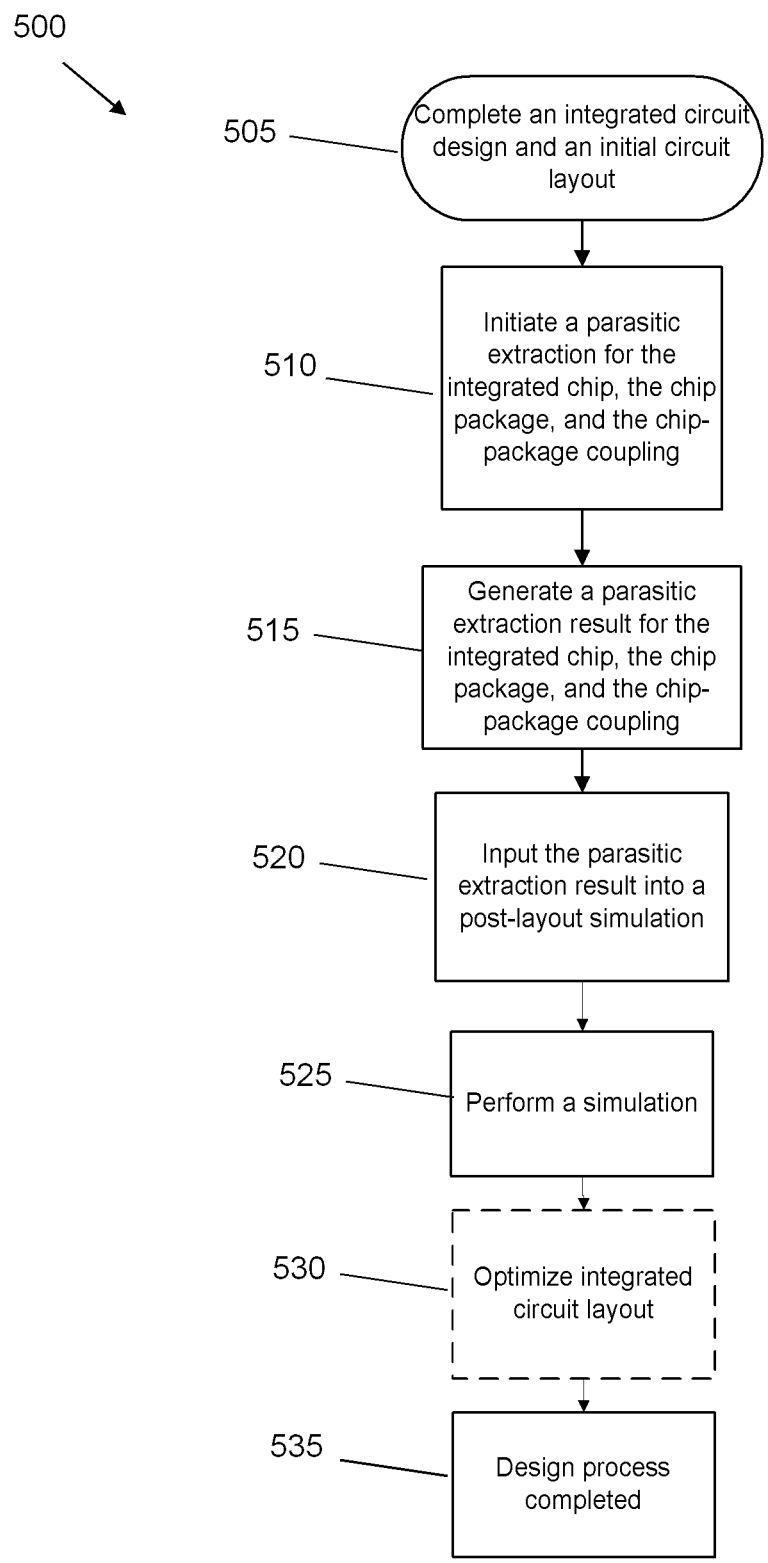

FIGS. 4 and 5 show exemplary flows for performing aspects of the present invention. The steps of FIGS. 4 and 5 may be implemented to extract parasitics of an integrated circuit including capturing mutual coupling effects between the integrated circuit chip and the chip package, and enable post-design testing and optimization of an integrated circuit using the extracted parasitics. The flowcharts and block diagrams in FIGS. 4 and 5 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented using a computing device. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow 400 for extracting parasitics of an integrated circuit including capturing mutual coupling effects between the integrated circuit chip and the chip package. At step 405, information including process technology parameters that describe electrical behavior for a region between a top of the integrated circuit chip and a top of the chip package (e.g., a region including: (i) dielectric layers and/or C4 via between the integrated circuit chip and the chip package, and (ii) the conductor layers of the chip package) are compiled.

In embodiments, the compiled information may include fabrication process parameters of various conductor layers (e.g., metal layers, interconnect wiring layers, or conductors) such as a minimum spacing and minimum width of the conductors, a thickness of the conductor layers, heights of the conductor layers above the semiconductor substrate, the resistivities of the conductor layers, the interlayer dielectric constant and thickness (in embodiments the dielectric constant may be selected as air), the name of a top conductor layer of a via, a bottom conductor layer of the via, contact resistance of the via, the names of wells, etc. The fabrication process parameters (e.g., electrical parameters of the conductor layers) for the chip package may be provided by a package vendor. The chip package and chip-package coupling information including the fabrication process parameters of the various conductor layers are then formatted such that the information can be included in a comprehensive parasitic or interconnect technology file (e.g., written to a configuration file).

At step 410, at least one conductor layer of the chip package is provided in a design kit. In embodiments, the at least one conductor layer is provided in the design kit such that the at least one conductor layer can be used for interconnecting circuit elements of the integrated circuit chip, the chip package, and the chip-package coupling. For example, a design kit may be modified to include at least one conductor layer of the chip package such that a chip designer or an automated program may use the at least one conductor layer defined in the parasitic technology file as a circuit interconnect layer such that the at least one conductor layer and the associated fabrication process parameters become integrated with the chip. Consequently, a parasitic extraction tool (e.g., EDA Tool 350 as described with respect to FIG. 3) may be used to calculate the capacitive coupling between all interconnects including the capacitive coupling to the at least one conductor layer of the chip package.

At step 415, the parasitic technology file is generated for the integrated circuit such that the file comprises all process technology parameters that describe electrical behavior for regions of the integrated circuit chip, the chip package, and the chip-package coupling. In embodiments, generating the parasitic technology file includes defining at least one conductor layer (e.g., a metal layer or interconnect wiring layer) of the chip package, which has a dominant coupling effect to the integrated circuit chip. Additionally, all process technology parameters that describe electrical behavior for the integrated circuit chip and the compiled information including all process technology parameters that describe electrical behavior for regions of the chip package and the chip-package coupling are written or coded into the parasitic technology file.

In embodiments, a solder ball, the region of the chip-package coupling/connection (e.g., the region from the last on-chip metal layer to the first package metal layer) is treated as a device model in the parasitic technology file and is netlisted like a device in post layout simulations. For example, treating the region of the chip-package coupling as a device model provides for flexibility to insert compact modeling calculations (e.g., Spice models) for the device model of the chip-package coupling and enhanced control of the accuracy and complexity of the chip-package coupling based on different design sensitivities.

At step 420, an effective ground plane reference is defined in the parasitic technology file. In embodiments, the ground plane reference is defined in the parasitic technology file to be sufficiently separated from the chip interconnect wiring layers and active devices such that the ground plane reference does not contribute significant capacitive coupling during simulation (e.g., there may be some parasitics to the ground plane calculated, but the parasitics will be very small relative to other parasitics calculated for the chip-package). Specifically, the ground plane reference may be defined 700 μm from the active devices during simulation. Preferably, the ground plane reference is defined at least 250 μm from the active devices or depends on real ground wafer thickness.

At step 425, a calibration process is performed on the parasitic technology file. In embodiments, this is performed by calibrating a capacitance table to have a parasitic capacitance value matching that of an actual contact/via configuration in an integrated circuit chip as should be understood by one of ordinary skill in the art such that no further explanation is needed.

FIG. 5 depicts an exemplary flow 500 for post-design testing and optimization of an integrated circuit using the comprehensive parasitic technology file generated with respect to FIG. 4. At step 505, an integrated circuit design is completed and an initial integrated circuit layout is generated including the integrated circuit chip and chip package. At step 510, a parasitic extraction is initiated for the integrated circuit chip, the chip package, and the chip-package coupling. Specifically, the parasitic extraction file generated in exemplary flow 400 is read into an extraction tool (e.g., EDA Tool 350 as described with respect to FIG. 3). At step 515, a parasitic extraction result is generated for the integrated circuit chip, the chip package, and the chip-package coupling and provided in a known format, e.g., a netlist of resistance and capacitance values annotated on each node of the design circuit. At step 520, the parasitic extraction result is read into a post-layout simulation tool (e.g., EDA Tool 350 as described with respect to FIG. 3). At step 525, a simulation step is performed as should be understood by one of ordinary skill in the art such that no further explanation is needed. If the parasitic extraction result causes undesirable performance of the integrated circuit, the integrated circuit layout is changed through one or more design optimization cycles at step 530. If the simulation results satisfy the design specification, the design process is completed at step 535.

Figure 6:
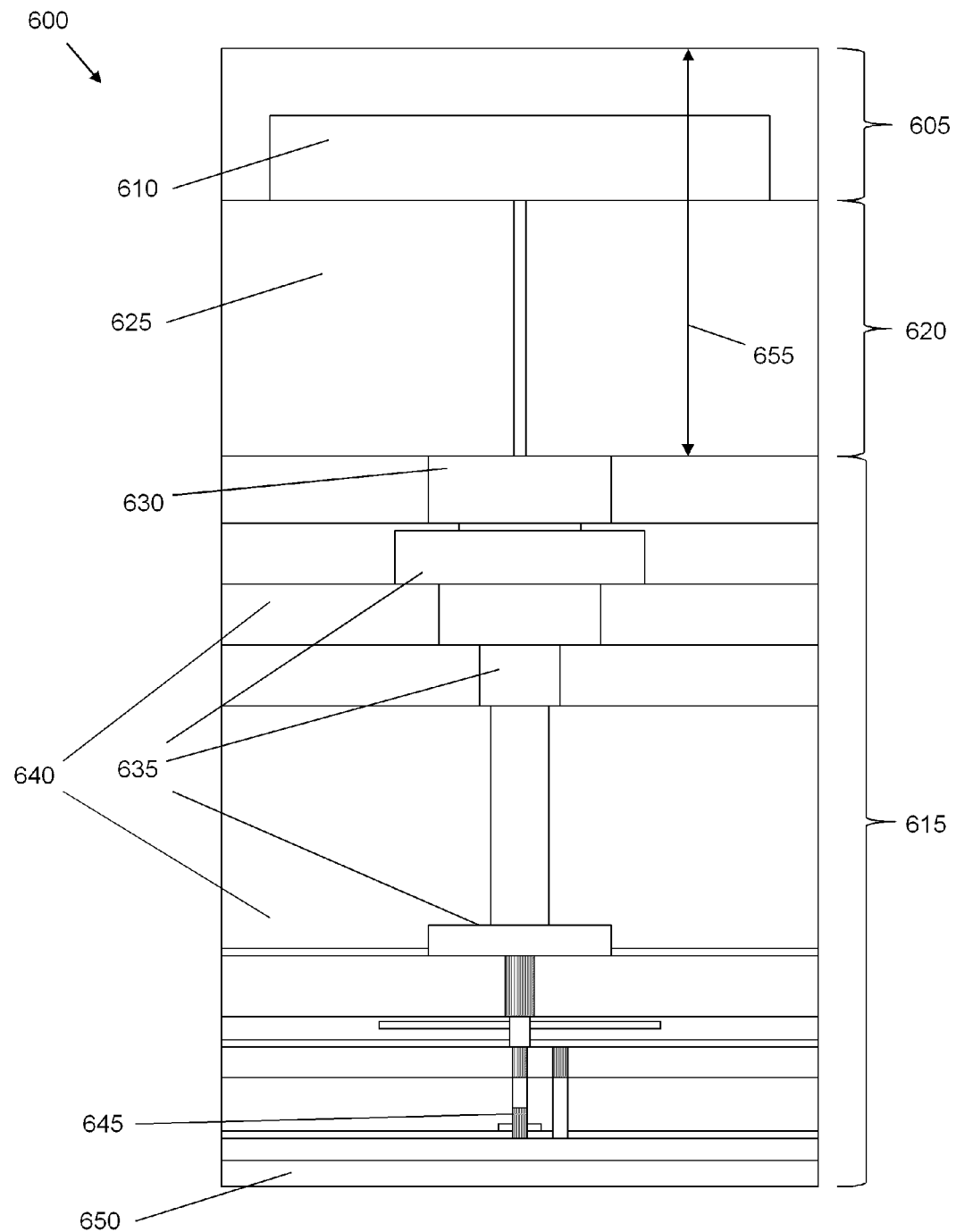

FIG. 6 shows a graphical cross-section of a parasitic technology file 600 in accordance with aspects of the invention. As should be understood by one of ordinary skill, the graphical cross-section shown in FIG. 6 is not drawn to scale for purposes of clarity. In this example, the chip package 605 is shown on top comprising at least one metal layer 610. The chip package 605 is attached to a chip 615 via a chip-package coupling 620 comprising dielectric layer 625 that may include a C4 via (not shown). The integrated circuit chip 615 starts at a top interconnect wiring layer 630 and continues through subsequent interconnect wiring and via layers 635, dielectric layers 640, and active devices 645 to a substrate 650.

As described herein, the parasitic technology file typically comprises layer thickness, dielectric constants, metal resistivities, via resistivities, etc. for regions of the chip including the interconnect wiring layers 630 and 635. However, in accordance with aspects of the invention, the parasitic technology file is also generated to comprise layer thicknesses, dielectric constants, metal resistivities, via resistivities, etc. for the region 655 between the top interconnect wiring layer 630 and the top of the chip package 605 in order to include the process parameters of various conductor layers in the chip package 605 and the chip-package coupling 620. Advantageously, implementations of the invention provide a truly comprehensive extraction solution and enable modeling of the mutual coupling between on-chip circuits and the chip package.

Figure 7:
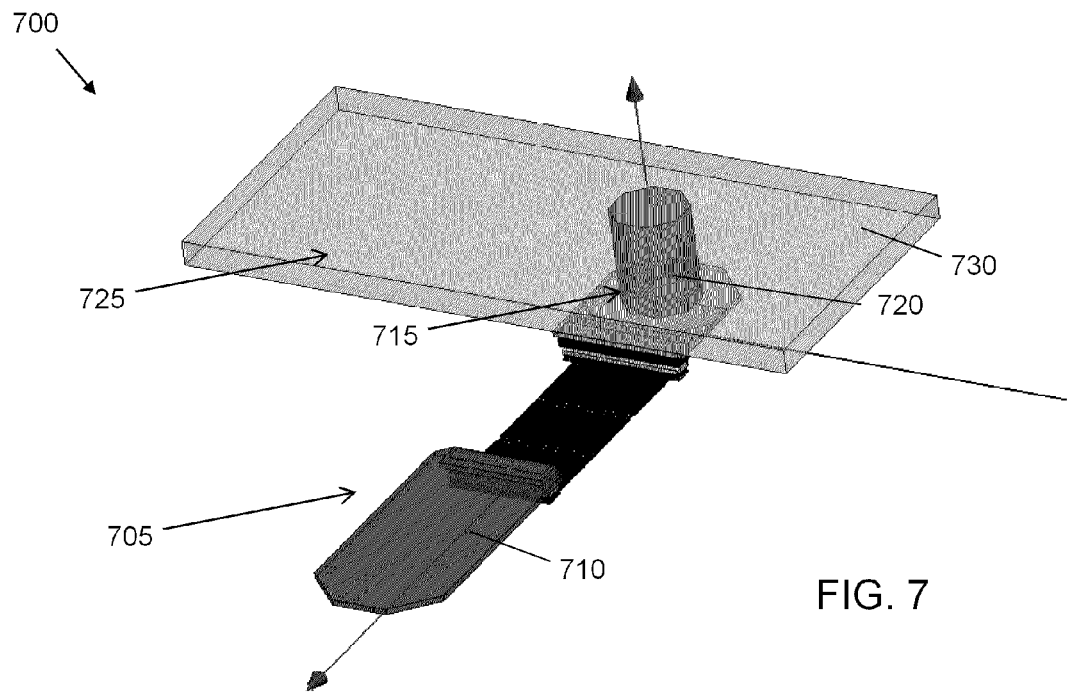
Figure 8:
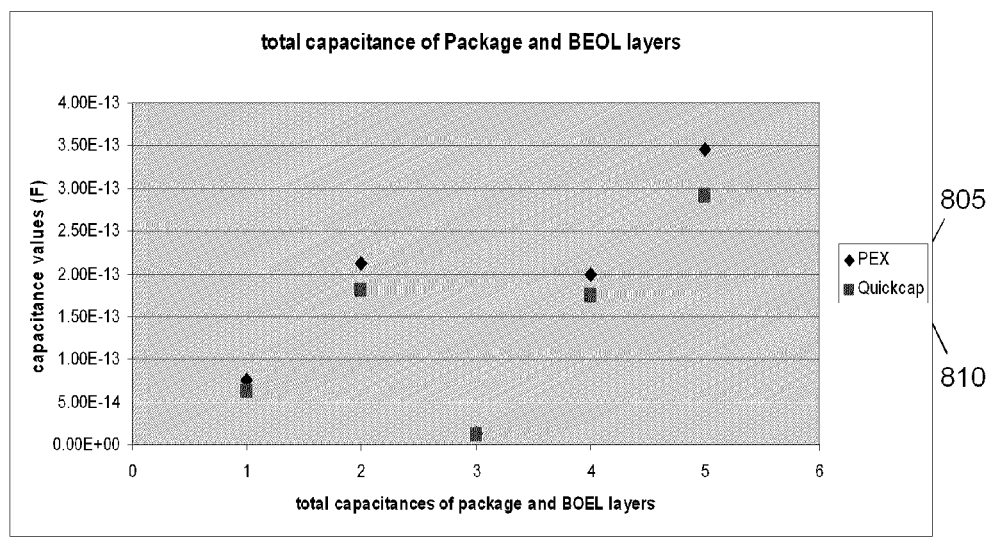

FIGS. 7-12 provide examples of using the above-described comprehensive parasitic technology file in post-design testing as compared to the industry standard, e.g., QuickCap® that uses a very localized approach for capacitance extraction from integrated circuits. Specifically, FIG. 7 shows a cross section 700 of an integrated circuit chip 705 including a back end of line (BEOL) layers 710, a chip-package coupling 715 including a C4 via 720, and a package 725 including a metal layer 730 (e.g., a conductor layer) in accordance with aspects of the invention. FIG. 8 shows simulation results 805 (e.g., a PEX tool) for the integrated circuit using a comprehensive parasitic technology file that takes into account process technology parameters that describe electrical behavior for the chip 705, the chip-package coupling 715, and the package 725 in accordance with process flow 400 (described with respect to FIG. 4). Specifically, FIG. 8 shows total capacitance including the chip-package coupling 715, package 725, and BEOL layers 710. The x-axis provides total capacitances including the chip-package coupling 715, package 725, and BEOL layers 710. The y-axis provides capacitance values. As can be seen in FIG. 8, the simulation results 805 are comparable to the industry standard results 810 obtained using a 3-D EM tool such as QuickCap®.

Figure 9:
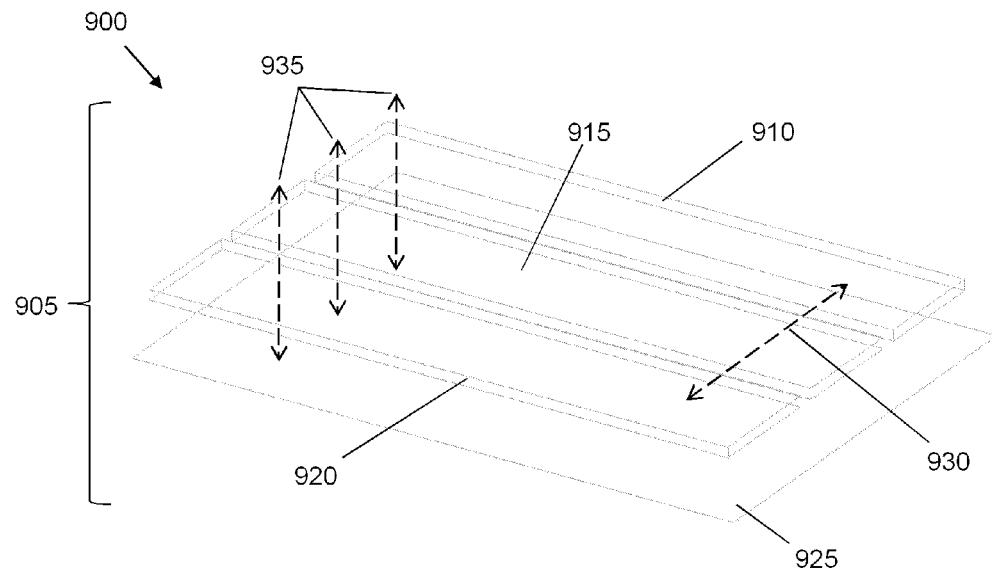
Figure 10:
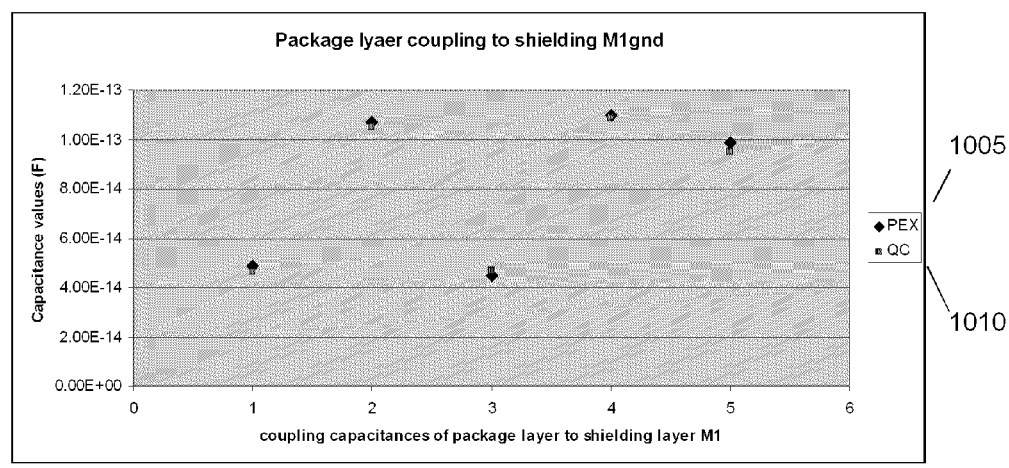

FIG. 9 shows a cross section 900 of an integrated circuit including a package 905 comprising three package layers 910, 915, and 920 and a metal shielding layer 925 representing semiconductor chip interconnect. As can be seen in cross section 900 there are capacitances 930 created between the three packages layers 910, 915, and 920 as well as capacitances 935 created between the three package layers 910, 915, and 920 and the metal shielding layer 925 on the semiconductor chip. FIG. 10 shows simulation results 1005 (e.g., a PEX tool) for the integrated circuit using a comprehensive parasitic technology file that takes into account process technology parameters that describe electrical behavior (e.g., the capacitances 930 and 935) for the three package layers 910, 915, and 920 and the semiconductor chip metal shielding layer 925 in accordance with process flow 400 (described with respect to FIG. 4). Specifically, FIG. 10 shows total capacitance including the three package layers 910, 915, and 920 and the semiconductor chip metal shielding layer 925. The x-axis provides total capacitances including the three package layers 910, 915, and 920 and the semiconductor chip metal shielding layer 925. The y-axis provides capacitance values. As can be seen in FIG. 10, the simulation results 1005 are comparable to the industry standard results 1010 obtained using a 3-D EM tool such as QuickCap®.

Figure 11:
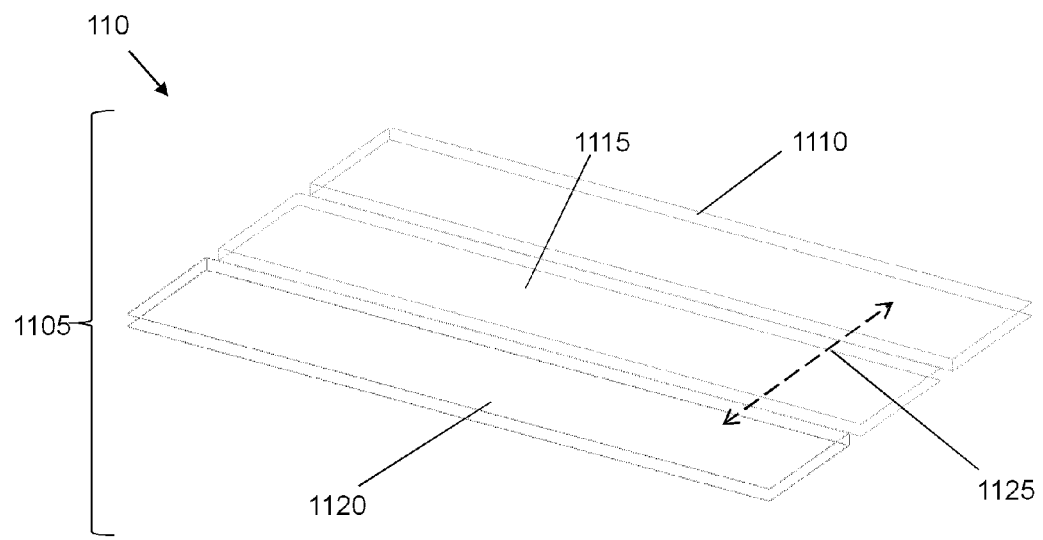
Figure 12:
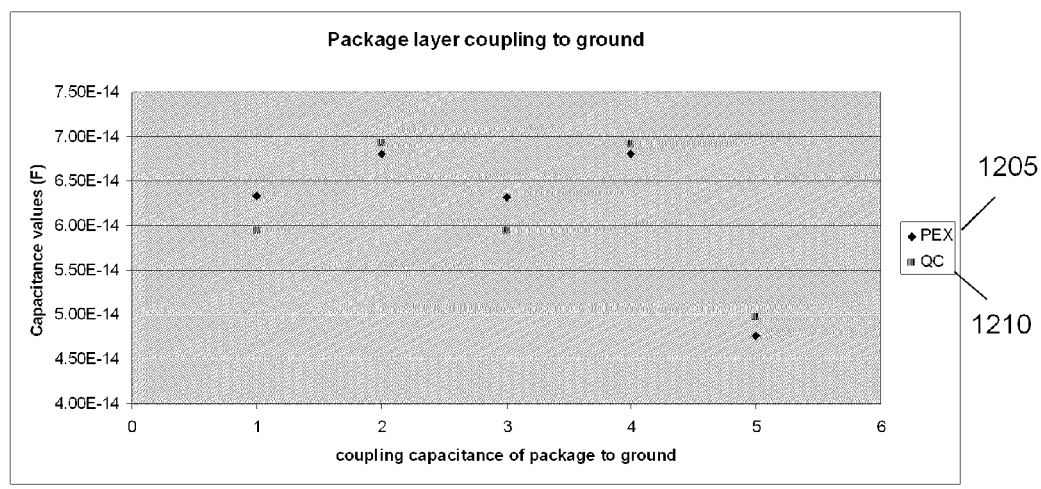

FIG. 11 shows a cross section 1100 of an integrated circuit including a package 1105 comprising three package layers 1110, 1115, and 1120 without a metal shielding layer. As can be seen in cross section 1100 there are capacitances 1125 created between the three packages layers 1110, 1115, and 1120. FIG. 12 shows simulation results 1205 (e.g., a PEX tool) for the integrated circuit using a comprehensive parasitic technology file that takes into account process technology parameters that describe electrical behavior (e.g., the capacitances 1125) for the three package layers 1110, 1115, and 1120 in accordance with process flow 400 (described with respect to FIG. 4). Specifically, FIG. 12 shows total capacitance including the three packages layers 1110, 1115, and 1120. The x-axis provides total capacitances including the three packages layers 1110, 1115, and 1120. The y-axis provides capacitance values. As can be seen in FIG. 12, the simulation results 1205 are comparable to the industry standard results 1210 obtained using a 3-D EM tool such as QuickCap®.

Figure 13:
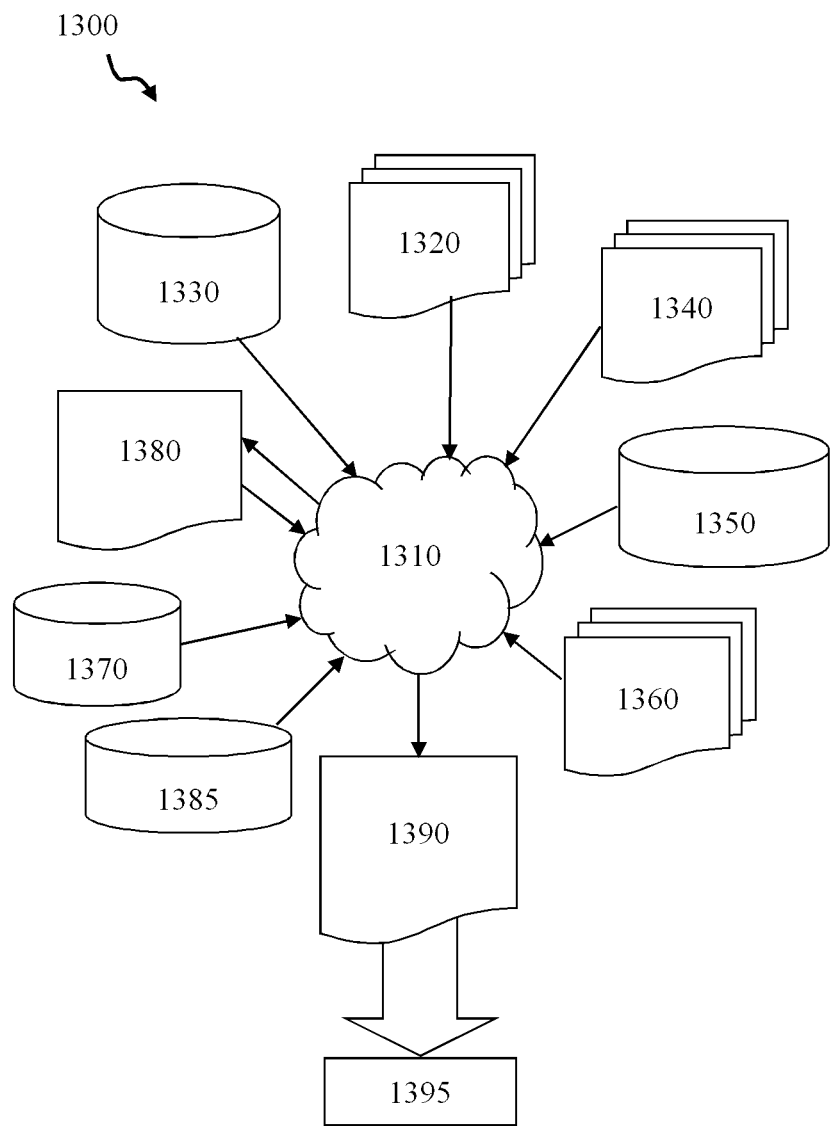

FIG. 13 shows a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of design structures and/or devices. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system, which can be implemented with the method and system of the present invention. As such, design structure 1320 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures to generate a netlist 1380, which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is re-synthesized one or more times depending on design specifications and parameters for the device. As with other design structure types described herein, netlist 1380 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385 that may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390.

Design structure 1390 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more devices. In one embodiment, design structure 1390 may comprise a compiled, executable HDL simulation model that functionally simulates the devices.

Design structure 1390 may also employ a data format used for the exchange of layout data of integrated circuits and/or symbolic data format (e.g. information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 1390 may then proceed to a stage 1395 where, for example, design structure 1390: proceeds to tape-out, is released to manufacturing, is released to a mask house, is sent to another design house, is sent back to the customer, etc.

The methods as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented in a computer infrastructure for designing an integrated circuit chip comprising:
   compiling process technology parameters that describe electrical behavior for the integrated circuit chip, a chip-package coupling, and a package of the integrated circuit chip; and
   generating a parasitic technology file for the integrated circuit chip that includes the compiled process technology parameters such that the integrated circuit chip, the chip-package coupling, and the package are treated as an integrated unit to account for coupling effects between the integrated circuit chip, the chip-package coupling, and the package,
   wherein at least the step of generating the parasitic technology file is performed using a processor of the computer infrastructure.

2. The method of claim 1, wherein the generating comprises defining at least one conductor layer of the package, which has a dominant coupling effect to the integrated circuit chip, in the parasitic technology file.

3. The method of claim 2, wherein the generating further comprises writing all process technology parameters that describe electrical behavior for the integrated circuit chip and the compiled process technology parameters that describe the electrical behavior for the chip-package coupling and the package into the parasitic technology file.

4. The method of claim 3, further comprising defining a ground plane reference in the parasitic technology file, wherein the ground plane reference is defined to be sufficiently separated from interconnect wiring layers and active devices of the integrated circuit chip such that the ground plane reference does not contribute significant capacitive coupling during simulation.

5. The method of claim 4, further comprising performing calibration of the parasitic technology file.

6. The method of claim 1, further comprising providing at least one conductor layer of the package in a design kit such that the at least one conductor layer can be used for interconnecting circuit elements of the integrated circuit chip, the chip package, and the chip-package coupling.

7. The method of claim 6, wherein the generating comprises defining the at least one conductor layer of the package in the parasitic technology file.

8. The method of claim 7, wherein the generating further comprises writing all process technology parameters that describe electrical behavior for the integrated circuit chip and the compiled process technology parameters that describe the electrical behavior for the chip-package coupling and the package into the parasitic technology file.

9. The method of claim 8, further comprising defining a ground plane reference in the parasitic technology file, wherein the ground plane reference is defined to be sufficiently separated from interconnect wiring layers and active devices of the integrated circuit chip such that the ground plane reference does not contribute significant capacitive coupling during post-layout simulation.

10. The method of claim 9, further comprising performing calibration of the parasitic technology file.

11. A method for post-design testing and optimization of an integrated circuit chip comprising:
   completing a design and layout of the integrated circuit chip;
   initiating a parasitic extraction for the integrated circuit chip, wherein the initiating comprises:
      compiling process technology parameters that describe electrical behavior for the integrated circuit chip, a chip-package coupling, and a package of the integrated circuit chip; and
      generating a parasitic technology file for the integrated circuit chip that includes the compiled process technology parameters such that the integrated circuit chip, the chip-package coupling, and the package are treated as an integrated unit to account for coupling effects between the integrated circuit chip, the chip-package coupling, and the package;
   generating a parasitic extraction result; and
   inputting the parasitic extraction result into a post-layout simulation,
   wherein at least the step of generating the parasitic technology file is performed using a processor.

12. The method of claim 11, further comprising:
   performing the post-layout simulation; and
   when the parasitic extraction result causes undesirable performance of the integrated circuit chip, the layout of the integrated circuit chip is changed through one or more design optimization cycles.

13. The method of claim 11, wherein the generating the parasitic technology file comprises defining at least one conductor layer of the package, which has a dominant coupling effect to the integrated circuit chip, in the parasitic technology file.

14. The method of claim 13, wherein the generating the parasitic technology file further comprises writing all process technology parameters that describe electrical behavior for the integrated circuit chip and the compiled process technology parameters that describe the electrical behavior for the chip-package coupling and the package into the parasitic technology file.

15. A method implemented in a computer-aided design system for generating a functional design model of an integrated circuit chip, the method comprising:
   defining a parasitic technology file containing elements that define at least one metal layer of the integrated circuit chip and at least one metal layer of a integrated circuit chip package; and
   writing process technology parameters into the parasitic technology file that describe electrical behavior for regions of the integrated circuit chip, the integrated circuit chip package, and chip-package coupling including the at least one metal layer of the integrated circuit chip and the at least one metal layer of the integrated circuit chip package such that the integrated circuit chip, the integrated circuit chip package, and the chip-package coupling are treated as an integrated unit to account for coupling effects between the integrated circuit chip, the integrated circuit chip package, and the chip-package coupling,
   wherein at least the step of defining the parasitic technology file is performed using a processor of the computer-aided design system.

16. The method of claim 15, wherein the electrical parameters of the at least one metal layer of the integrated circuit chip package are provided by a package vendor.

17. The method of claim 15, wherein the technology parameters include at least one of: a minimum spacing and minimum width of conductors, a thickness of the conductors, heights of the conductors above a semiconductor substrate, resistivities of the conductors, interlayer dielectric constants and thicknesses, name of a top conductor layer of a via, a name of a bottom conductor of the via, contact resistance of the via, and names of wells.

18. The method of claim 15, further comprising defining a ground plane reference in the parasitic technology file, wherein the ground plane reference is defined to be sufficiently separated from interconnect wiring layers and active devices of the integrated circuit chip such that the ground plane reference does not contribute significant capacitive coupling during post-layout simulation.

19. The method of claim 15, further comprising treating the regions of the chip-package coupling as a device model in the parasitic technology file.

20. The method of claim 19, further comprising net listing the device model of the chip-package coupling in post-layout simulations.

* * * * *